United States Patent [19]

Shibuya et al.

[11] 3,880,617
[45] Apr. 29, 1975

[54] PROCESS FOR PREPARING PURIFIED COKE OVEN GAS

[75] Inventors: Tatsuo Shibuya, Tokyo; Takashi Hosoya, Sagamihara; Fumio Sudo, Yokohama; Tsutomu Hoshino, Kitakushu; Sunao Yamada, Kitakushu; Hifumi Hiraoka, Kitakushu, all of Japan

[73] Assignees: Mitsubishi Chemical Industries, Ltd.; Mitsubishi Kakoki Kaisha Ltd., both of Tokyo, Japan

[22] Filed: May 28, 1974

[21] Appl. No.: 474,072

[30] Foreign Application Priority Data
May 26, 1973 Japan............... 48-58874
May 28, 1973 Japan............... 48-59573

[52] U.S. Cl. ............ 55/68; 55/70; 55/73; 55/94
[51] Int. Cl. ........................... B01d 53/14
[58] Field of Search ......... 55/68, 73, 52, 51, 48, 55/93, 94, 70; 423/234, 563

[56] References Cited
UNITED STATES PATENTS
2,878,099  3/1959  Breuing et al. ............ 423/234 X
3,789,105  1/1974  Tippmer et al. ............ 423/234

Primary Examiner—Charles N. Hart
Assistant Examiner—Ethel R. Cross
Attorney, Agent, or Firm—Oblon, Fisher, Spivak, McClelland & Maier

[57] ABSTRACT

Purified coke oven gas, substantially free of hydrogen sulfide, is prepared by counter-currently contacting said gas with an absorbent ammonia solution in a multi-stage absorber, dividing the absorbent solution discharged from the absorber and feeding said solution to the top and middle of a stripping tower in a ratio of 0.05 to 1 by weight, where the solution is contacted with steam to remove the acidic gas from the absorbent solution.

3 Claims, 1 Drawing Figure

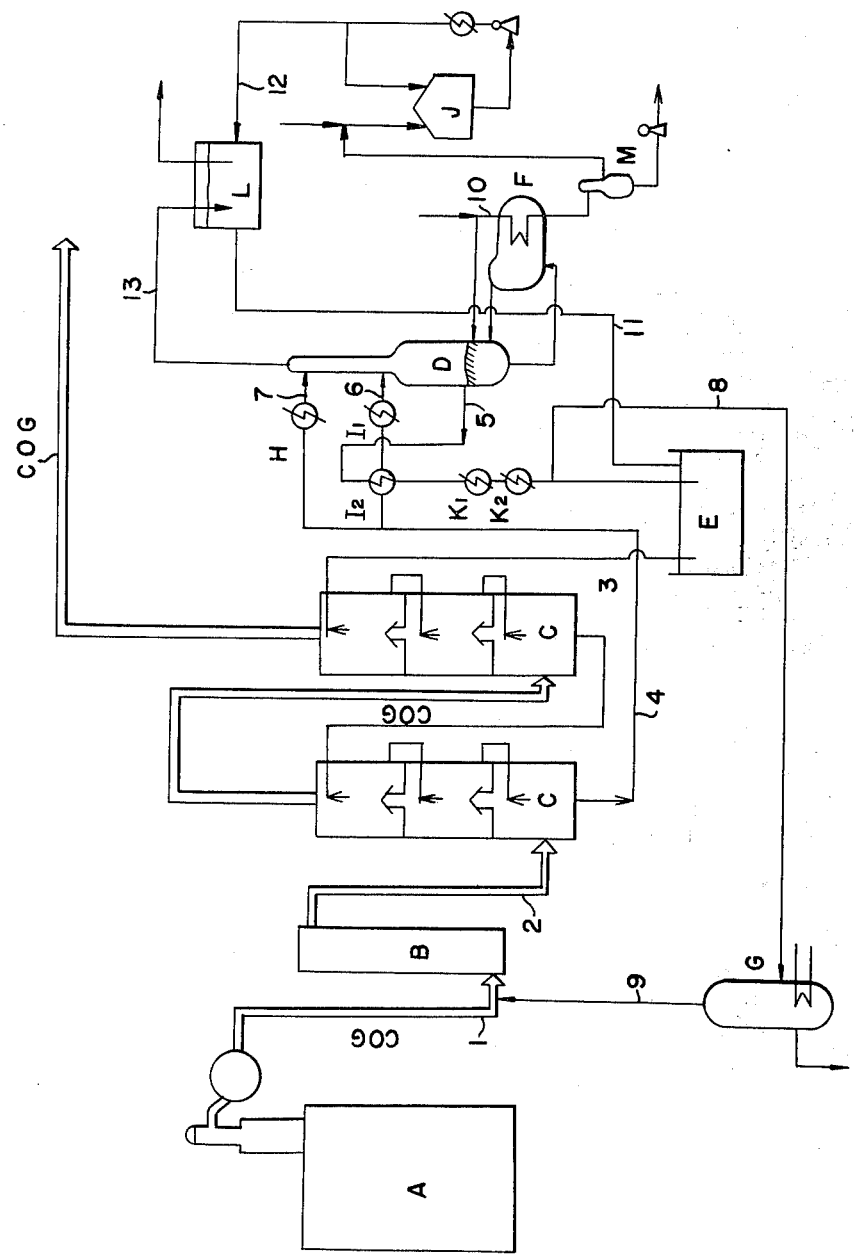

PROCESS FOR PREPARING PURIFIED COKE OVEN GAS

BACKGROUND OF THE INVENTION

1. Field of the Invention

The present invention relates to a process for preparing a coke oven gas containing substantially no sulphur component by contacting the coke oven gas with an absorbent solution, such as an ammonia solution, to separate the hydrogen sulfide contained in the coke oven gas.

2. Description of the Prior Art

Coke oven gas prepared by coal carbonization (dry distillation) contains a relatively high amount of impurities, such as acidic gas components, e.g. hydrogen sulfide, carbon dioxide, hydrogen cyanide, together with tar, water, benzol, naphthalene and ammonia. These impurities clog or corrode pipes and other equipment and are toxic to humans. Accordingly, it is difficult and occasionally dangerous to supply coke oven gas to desired locations. Hence, these impurities must be removed. Heretofore, the tar, water, benzol, and naphthalene have been easily separated and removed by cooling the coke oven gas or washing the gas with an oil. The Collin method, Otto method, Kopper method and others have been used for removing the acidic gas from coke oven gas. In these processes the acidic gas is absorbed in a solution of ammonia water and then the absorbent solution is heated with steam to separate the acidic gas. The reproduced absorbent solution is recycled. A relatively high degree (e.g. 90%) of separation of hydrogen sulfide has been attained by said known methods. However, the rate of separation of hydrogen sulfide has been low, the selectivity for hydrogen sulfide from the coke oven gas has been low, and the consumption of steam has been disadvantageously high by said known methods.

In the prior art methods, the reproduced absorbent solution discharged from the bottom of the acid gas stripping (deacid) tower has been directly fed to the absorber to recycle the absorbent solution. The reproduced absorbent solution contains ammonia and a small amount of hydrogen cyanide and other acidic gas components. Accordingly, the absorbing efficiency in the absorber will be disadvantageously decreased by continued recycling over a long period of time.

The acidic gas contains hydrogen sulfide together with hydrogen cyanide (usually 3 – 5% by volume) and ammonia gas (more than 100 ppm). Accordingly, the passages in the catalyst beds become clogged with ammonium sulfate in the preparation of high purity sulfur from the acid gas by the Claus and other methods. Sulfuric acid and fuming sulfuric acid are often colored by the formation of $NO_x$ from a part of the HCN in the preparation of said acids by directly burning the acidic gas.

Accordingly, the acidic gas has been used only for preparation of relatively worthless products, such as dilute sulfuric acid. A need exists therefore, for an efficient method of purifying coke oven gas, which will remove hydrogen sulfide quickly, selectively and cheaply.

SUMMARY OF THE INVENTION

Accordingly, one object of the present invention is to provide a process for preparing a purified coke oven gas by effectively separating the acidic gas contained therein.

These and other objects as will hereinafter become more readily understood by the following description can be attained by contacting counter-currently a coke oven gas with an absorbent solution of ammonia water in an absorber having a plurality of absorbing stages to absorb the acidic gas components, especially hydrogen sulfide, from the coke oven gas into the absorbent solution.

The absorbent solution containing the acidic gas discharged from the absorber is heated with steam in an acid gas stripping tower to separate substantial amounts of the acidic gas from the absorbent solution, and the reproduced absorbent solution is recycled to the absorber. The absorbent solution discharged from the absorber is divided and fed to the top and middle of the acid gas stripping tower in the ratio of more than 0.05 by weight of absorbent solution fed to the top to 1 by weight of absorbent solution fed to the middle, and the temperature of the absorbent solution fed to the top is kept at lower than 40°C.

BRIEF DESCRIPTION OF THE DRAWINGS

FIG. 1 is a flow sheet of one embodiment of the process according to the invention.

DETAILED DESCRIPTION OF THE PREFERRED EMBODIMENTS

In FIG. 1, a feed stock coal is carbonized in coke oven A to produce a coke oven gas. The coke oven gas is cooled by heat-exchange with sea water or other coolant in primary cooler B. The acidic gas component in the coke oven gas is removed by absorbtion in an absorbent solution made of ammonia water (hereinafter referred to as the absorbent solution) in absorber C. The acidic gas component in the absorbent solution discharged from absorber C through pipe 4, is regenerated in the acid gas stripping tower (hereinafter referred to as stripping tower) D. The reproduced absorbent solution which is discharged from stripping tower D through pipe 5 and cooled in heat-exchanger $I_2$, and cooled in coolers $K_1$, $K_2$ (hereinafter referred to as reproduced absorbent solution) is stored in storage tank E. Ammonia gas is separated from the reproduced absorbent solution, which was fed from stripping tower D, through pipe 8 in ammonia stripper G. Steam fed from pipe 10 is condensed in reboiler F and the condensed water is stored in storage tanks M and J. From storage tank M, boiler feed water is fed to storage tank J, if necessary. Ammonia gas remaining in the acidic gas separated from the top of stripping tower D is absorbed by condensed water in washing apparatus L. The coke oven gas produced in coke oven A is fed through pipe 1 to primary cooler B to cool and is fed through pipe 2 to absorber C. Absorber C is a multi-stage spray tower wherein the coke oven gas is counter-currently contacted with the absorbent solution fed through pipe 3 to each stage. The absorbent solution contacted with the coke oven gas at the rear stage is fed to the front stage by spraying so as to contact the coke oven gas.

The selective absorption of hydrogen sulfide from acidic gas is economically accomplished by maintaining the contact temperature of the absorbent solution with the coke oven gas in the absorber at greater than 30°C, by keeping the concentration of ammonia in the absorbent solution at less than 10 g/l. When the contact temperature is lower than 30°C, a large amount of HCN gas will be absorbed together with hydrogen sulfide from the coke oven gas, whereby the selective absorption of hydrogen sulfide will decrease and HCN gas will disadvantageously contaminate the acidic gas discharged from the top of the stripping tower since the absorbent solution will contain HCN gas. The upper limit of the contact temperature is not critical as long as a suitable ammonia concentration is maintained under the operating pressure employed to substantially absorb the hydrogen sulfide. The process is preferably carried out at lower than 60°C, most preferably at lower than 45°C under about atmospheric pressure.

The absorption of hydrogen sulfide will increase with increasing volatile ammonia concentration in the absorbent solution fed to the absorber. When the ammonia concentration is higher than 10 g/l, the absorption of hydrogen sulfide will not increase further, but the absorption of HCN gas in the absorbent solution will result. As a result, a large amount of HCN gas will contaminate the acidic gas discharged from the stripping tower. Accordingly, in order to attain the objects of the invention, the ammonia concentration of the absorbent solution is preferably kept lower than 10 g/l. However, when the ammonia concentration of the absorbent solution is too low, the absorbing efficiency will decrease and a larger absorber will be required. Accordingly, the ammonia concentration is preferably kept higher than 4 g/l. When the number of stages of the absorber is insufficient, the contacting efficiency of the coke oven gas with the absorbent solution will decrease. On the other hand, the desulfurizing efficiency will not be effectively increased by employing more than 10 stages. Accordingly, 5 – 8 stages in the absorber are preferable.

More than half of the absorbent solution discharged from the bottom of absorber C through pipe 4 is heated in heat-exchanger $I_1$. Hot absorbent solution is fed from stripping tower D through pipe 5, to heat exchanger $I_2$ and the heated absorbent solution is then fed through pipe 6 to the middle part of stripping tower D. On the other hand, the remaining absorbent solution from absorber C is cooled by cooler H to 0° – 40°C and is fed through the pipe 7 to the top of stripping tower D. The ratio of absorbent solution fed to the top to that fed to the middle is preferably 0.05 (by weight) to 1 (by weight). When the temperature of the absorbent solution fed to the top is higher than 40°C or the ratio of the absorbent solution fed the top to that fed to the middle is lower than 0.05 by weight to 1 by weight, more than 0.5% by volume of HCN gas will contaminate the acidic gas discharged from stripping tower D. This difficulty will prevent the preparation of sulfuric acid or sulfur of high purity from the acidic gas. Hence, the ratio of the absorbent solution fed to the top to the absorbent solution fed to the middle part of the stripping tower is preferably more than 0.05–0.15 : 1.0 by weight. If too large an amount of absorbent solution is fed to the top, the separation of ammonia gas from the acidic gas in the absorbent solution will become difficult and the steam consumption in the stripping tower will increase. This is clearly economically disadvantageous.

The HCN gas content in the acidic gas discharged from the top of the stripping tower can be kept lower than 0.5% by volume by the process of the invention. However, ammonia gas will remain in the acidic gas and adversely affect subsequent steps. Accordingly, the remaining ammonia gas is removed by washing in washing apparatus L with condensed water obtained in condenser M by condensation of the steam used as heat source for reboiler F, and then the acidic gas is fed to an acidic gas treating apparatus such as a sulfur recovering apparatus, burning apparatus or the like (not shown). The ammonia gas content in the acidic gas can be decreased to lower than 100 ppm by the washing. Accordingly, when high purity sulfur is to be prepared in a Claus kiln using the acidic gas, the formation of ammonium sulfate can be prevented and clogging of the catalyst can be prevented. The condensed water, which absorbs the ammonia gas from the acidic gas, can also be fed through pipe 11 to the reproduced absorbent solution storage tank E.

When all of the reproduced absorbent solution discharged from the bottom of the stripping tower D is recycled to the absorber C, a certain amount of cyanides, such as rhodanates or other unreproducible salts are accumulated in the absorbent solution. Accordingly, the absorbing efficiency in the absorber will decrease in long-term recycling operations. Hence, it is necessary to purge a portion of the reproduced absorbent solution and to add condensed water and ammonia water to keep the absorbing efficiency constant. The water containing ammonia gas, obtained in the washing step, can be effectively used as the additional water. The decrease in ammonia content of the absorbent solution caused by the purging of a portion of the absorbent solution can be compensated for by supplying to the coke oven gas, ammonia gas recovered from the purged reproduced absorbent solution, whereby the ammonia content in the absorbent solution can be kept substantially constant. The decrease of the ammonia content may also be compensated for by adding other ammonia sources instead of the ammonia gas recovered from the purged solution.

The residual solution after separating ammonia in ammonia stripper G is a composition which can be easily treated by a conventional activated sludge process (not shown). When the amount of solution purged is too small, the absorbing efficiency will decrease. When the amount of solution purged is too large, a large volume of steam will be required in ammonia stripper G, and the load in the activated sludge process will increase. Accordingly, the amount of solution purged must be suitably selected.

By the process of the invention, the acidic gas component, especially hydrogen sulfide, can be effectively separated from coke oven gas. The hydrogen sulfide separated in the stripping tower contains substantially no HCN (less than 0.5% by volume) and may be used as a sulfur source by supplying to a Claus kiln or other apparatus. Ammonia gas remaining in the acidic gas component discharged from the top of the stripping tower is absorbed with soft water condensed from the steam used for heating the stripping tower, whereby the ammonia gas content in the acidic gas is decreased to lower than 100 ppm. Accordingly, difficulty caused by the formation of ammonium sulfate, which causes the clogging of catalyst beds in the preparation of high purity sulfur from acidic gas by the Claus method may be prevented.

Having generally described the invention, a further understanding can be obtained by certain specific examples which are provided herein for purposes of illustration only and are not intended to be limiting in any manner.

EXAMPLE 1

As shown in the FIGURE, a coke oven gas having the following composition was fed to the inlet of a 6-stage absorber and passed from the lower part to the upper part at a rate of 90,000 Nm³/hr. An absorbent solution containing 7.5 g/l of ammonia was sprayed from the top of the absorber to contact counter-currently the coke oven gas at 35°C. The absorbent solution was discharged from the bottom of the absorber. The discharged absorbent solution was fed to the top and the middle of the stripping tower in the ratio of 1 : 15 of (absorbent sol. to the top to that to the middle). The absorbent solution fed to the top was cooled to 22°C. in the stripping operation. The acidic gas discharged from the top of the stripping tower was washed with 100 l of condensed water per 1000 m³ of coke oven gas. A part of the reproduced absorbent solution discharged from the bottom of the stripping tower was purged and the same amount of condensed water was added. The components in the coke oven gas at the outlet of the absorber and the components in the acidic gas discharged from the top of the stripping tower were measured.

The results were as follows:

Coke oven gas composition:
| Component | at inlet of absorber | | at outlet of absorber | |
|---|---|---|---|---|
| $CO_2$ | 59 g/Nm³ | - total gas | 55 g/Nm³ | - total gas |
| $H_2S$ | 3.48 | '' | 0.26 | '' |
| HCN | 2 | '' | 1.98 | '' |

During the operation of the plant, about 92% desulfurizing efficiency was maintained.

Acidic gas composition:
| Component | Content | |
|---|---|---|
| $CO_2$ | 53.1 | vol. % |
| $H_2S$ | 46.8 | '' |
| HCN | 0.1 | '' |
| $NH_3$ | 88 | ppm |

When the acidic gas was fed into the Claus kiln, there was no difficulty from clogging of the Claus catalyst bed and the formation of ammonium sulfate was not noted. The HCN content in the acidic gas was less than 0.5% by volume and the ammonia content was less than 100 ppm.

Reference 1

As shown in the FIGURE, the coke oven gas having the following composition was fed to the inlet of a 6-stage absorber and passed from the lower part to the upper part at a rate of 90,000 Nm³/hr. The absorbent solution containing 15 g/l was sprayed from the top of the absorber to contact counter-currently the coke oven gas at 20°C. The coke oven gas composition at the outlet of the absorber was measured.

Coke oven gas composition:
| Component | at inlet of absorber | | at outlet of absorber | |
|---|---|---|---|---|
| $CO_2$ | 59 g/Nm³ | - total gas | 52 g/Nm³ | - total gas |
| $H_2S$ | 3.48 | '' | 0.55 | '' |
| HCN | 2 | '' | 1.0 | '' |

As is clear from the results, the selective absorbing efficiency of hydrogen sulfide from the coke oven gas was low when the ammonia content of the absorbent solution was higher than 10 g/l and the contact temperature was lower than 30°C.

Reference 2

The operation of Example 1 was repeated except that the temperature of the absorbent solution fed to the top of the stripping tower was 60°C. The composition of the acidic gas discharged from the top of the stripping tower was measured.

Acidic gas composition:
| Component | Content | |
|---|---|---|
| $CO_2$ | 52.7 | vol. % |
| $H_2S$ | 40.3 | '' |
| HCN | 5.0 | '' |
| $NH_3$ | 2.0 | '' |

As is clear from the results, the HCN gas content in the acidic gas discharged from the top of the stripping tower was 5.0% by volume when the temperature of the absorbent solution fed to the top was higher than 40°C. Accordingly, the recovery of high purity sulfur from the Claus kiln will be difficult.

Examples 2 – 7

The operation of Example 1 was repeated in the system of FIG. 1 except that the conditions shown in the following table were employed. The results are shown in the Table.

TABLE

| Subject | | Exp 2 | Exp 3 | Exp 4 | Exp 5 | Exp 6 | Exp 7 |
|---|---|---|---|---|---|---|---|
| Temperature in absorber (°C) | | 33 | 32.1 | 34 | 37.3 | 36 | 40 |
| Rate of absorbent fed to absorber (m³/hr) | | 305 | 307.2 | 214 | 285 | 241 | 283.9 |
| Composition of absorbent fed to absorber (g/l) | $NH_3$ | 8.75 | 8.84 | 8.01 | 8.36 | 7.61 | 6.81 |
| | $H_2S$ | 0.21 | 0.23 | 0.22 | 0.26 | 0.12 | 0.17 |
| | $CO_2$ | 0.01 | 0.00 | 0.02 | 0.01 | 0.00 | 0.01 |
| | HCN | 0.66 | 0.70 | 0.59 | 0.44 | 0.76 | 0.40 |
| Composition of absorbent discharged from absorber (g/l) | $NH_3$ | 8.81 | 9.09 | 8.15 | 8.39 | 7.64 | 7.11 |
| | $H_2S$ | 1.63 | 1.60 | 1.46 | 1.50 | 1.66 | 1.35 |
| | $CO_2$ | 2.49 | 2.45 | 1.69 | 1.97 | 1.88 | 1.39 |
| | HCN | 0.78 | 0.75 | 0.74 | 0.47 | 0.98 | 0.51 |

TABLE—Continued

| Subject | | Exp 2 | Exp 3 | Exp 4 | Exp. 5 | Exp 6 | Exp 7 | |
|---|---|---|---|---|---|---|---|---|
| Amount of absorbent fed to ST (m³/hr) | top | 30 | 30 | 34.8 | 30 | 29.6 | 34.8 | |
| | middle | 275 | 277.2 | 249.2 | 255 | 218.4 | 249.0 | |
| | top/middle | 0.109 | 0.108 | 0.14 | 0.118 | 0.136 | 0 | .14 |
| Composition of acidic gas discharged from top of ST (vol.%) | $H_2S$ | 42.2 | 41.9 | 40.5 | 39.9 | 46.0 | 42.9 | |
| | $CO_2$ | 56.9 | 56.5 | 58.4 | 58.8 | 52.7 | 53.0 | |
| | HCN | 0.09 | 0.08 | 0.11 | 0.12 | 0.1 | 0.08 | |
| | $NH_3$ | 0.01 | 0.01 | 0.008 | 0.01 | 0.009 | 0 | .01 |
| Temperature at top of ST °C | | 23 | 23 | 20 | 23 | 22 | 23 | .5 |
| Composition of acidic gas inlet of absorber (g/Nm³) | $CO_2$ | 59 | 59.0 | 59 | 59.9 | 59 | 59 | |
| | $H_2S$ | 5.05 | 4.85 | 3.92 | 4.5 | 4.3 | 4.17 | |
| | HCN | 2.0 | 2.0 | 2.0 | 2.0 | 2.0 | 2 | .0 |
| outlet of absorber (g/Nm³) | $CO_2$ | 50.4 | 51.3 | 52.6 | 51.6 | 53.6 | 53.7 | |
| | $H_2S$ | 0.25 | 0.25 | 0.38 | 0.47 | 0.55 | 0.58 | |
| | HCN | 1.93 | 1.94 | 1.95 | 1.96 | 1.96 | 1 | .96 |
| Desulfurizing rate (%) | | 95.0 | 95.0 | 90.3 | 89.6 | 87.2 | 86.9 | |

Note
ST: stripping tower absorbent means absorbent solution.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for preparing a purified coke oven gas which comprises contacting counter-currently a coke oven gas with an absorbent solution of ammonia in an absorber having a plurality of absorbing stages, to absorb an acidic gas in the coke oven gas into the absorbent solution, heating the absorbent solution containing the stripping gas discharged from the absorber with steam in a deacid tower to separate substantial amounts of the acidic gas from the absorbent solution and recycling the reproduced absorbent solution to the absorber, the improvement wherein the absorbent solution discharged from the absorber is divided and fed to the top and middle parts of the stripping tower in a ratio of more than 0.05 by weight of the absorbent solution fed to the top to 1 by weight of the absorbent solution fed to the middle part, and the temperature of the absorbent solution fed to the top is maintained at lower than 40°C.

2. The process for preparing a purified coke oven gas of claim 1, wherein the contact temperature of the coke oven gas with the ammonia solution is maintained higher than 30°C, and the ammonia concentration in the absorbent solution fed to the absorber is maintained lower than 10 g/l.

3. The process for preparing a purified coke oven gas of claim 1, wherein the acidic gas separated in the stripping tower is washed with condensed water obtained from the stream used for heating the stripping tower, whereby the remaining ammonia gas in the acidic gas is absorbed in the condensed water and the resulting ammonia solution is mixed with the absorbent solution recycled from the stripping tower to the absorber.

* * * * *